No. 706,827. Patented Aug. 12, 1902.
C. W. JAMES.
REVERSING MECHANISM.
(Application filed Dec. 12, 1901.)
(No Model.) 2 Sheets—Sheet 1.

Witnesses:
W. A. Schaefer
F. L. Moieter

Inventor,
Charles W. James.
By his Attorney
Chas. A. Pautter

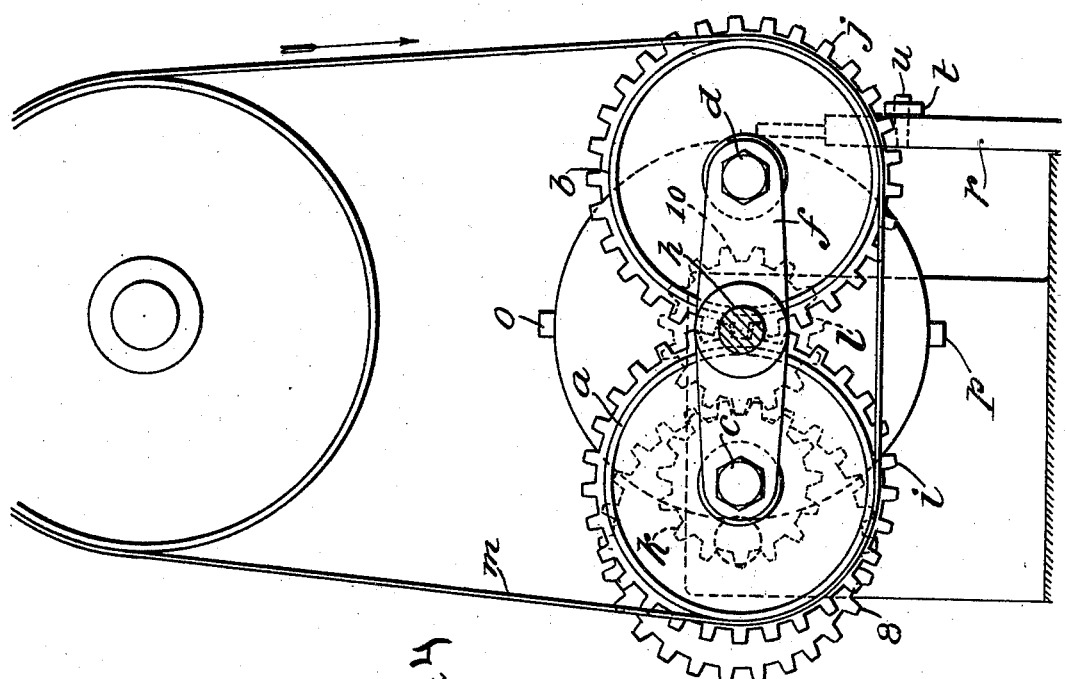
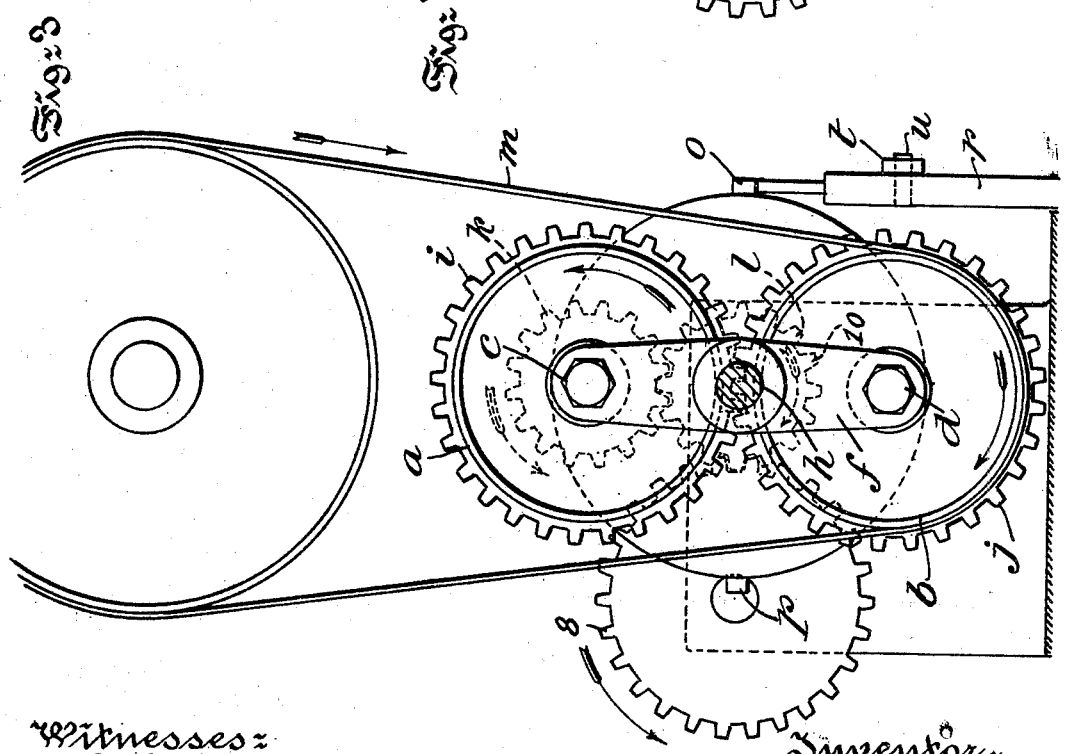

UNITED STATES PATENT OFFICE.

CHARLES W. JAMES, OF PHILADELPHIA, PENNSYLVANIA.

REVERSING MECHANISM.

SPECIFICATION forming part of Letters Patent No. 706,827, dated August 12, 1902.

Application filed December 12, 1901. Serial No. 85,629. (No model.)

*To all whom it may concern:*

Be it known that I, CHARLES W. JAMES, a citizen of the United States, and a resident of the city and county of Philadelphia, State of Pennsylvania, have invented certain new and useful Improvements in Reversing Mechanism, of which the following is a specification.

My invention relates to improvements in reverse movements; and the object of my invention is to furnish an improved reverse movement applicable to all forms of machines receiving their movement directly or indirectly from a revolving shaft and belt, which will be simple and inexpensive in construction, positive in its action, and which can be operated with a minimum expenditure of power.

Figure 1:
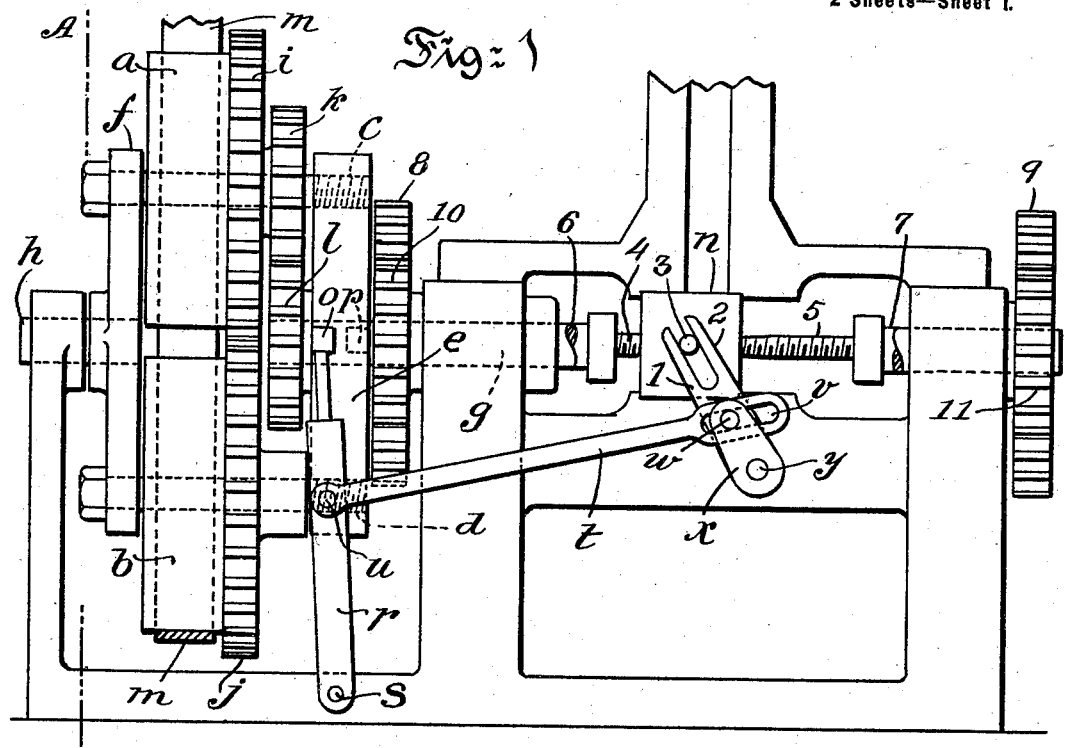
Figure 2:
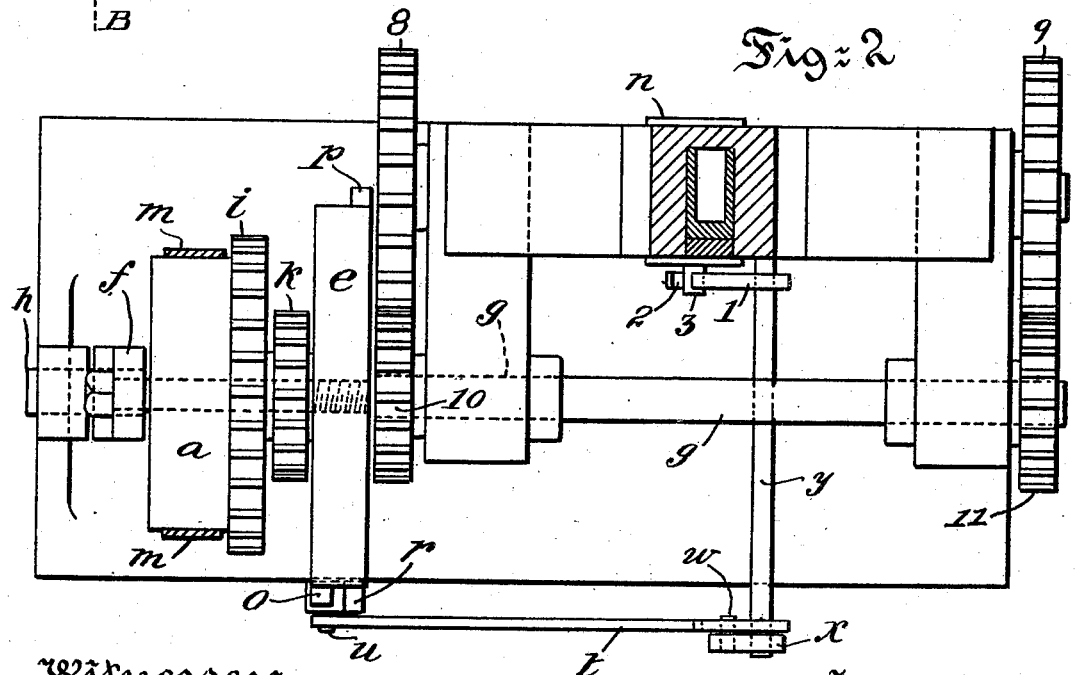

In the accompanying drawings, forming part of this specification, and in which similar characters of reference indicate similar parts throughout the several views, Figure 1 is a side elevation of my reversing mechanism attached to an automatic nut-threading machine; Fig. 2, a plan of Fig. 1; Fig. 3, a front elevation of the reversing mechanism, the carrying-shaft $h$ being driven by the driving-belt; Fig. 4, a similar view, the pulleys being rotated upon their supporting-shaft ninety degrees.

$a\ b$ are two pulleys carried upon studs $c\ d$, which are carried in bearings in bearing-pieces $e\ f$. $g\ h$ are shafts upon which the bearing-pieces $e\ f$ are carried, the former being connected to or forming part of the mechanism that is to be reversed.

Fast upon pulleys $a\ b$ or upon hubs secured to these pulleys are gears $i\ j$, which are in mesh and either of which is adapted to drive the other, and secured to and turning with gear $i$ is a gear $k$, which meshes with and drives a gear $l$, fast to shaft $g$.

$m$ is a belt driven in any suitable manner, which drives either pulley $a$ or pulley $b$. Supposing that pulley $b$ is being driven, this pulley drives gear $j$, which drives gear $k$, which latter drives gear $l$ and shaft $g$ in one direction. If it be desired to drive the shaft $g$ in the other direction, the pulleys $a\ b$ and their carrying bearing-pieces $ef$ are rotated around the shafts $g\ h$ until the pulley $a$ is in the position formerly occupied by pulley $b$. The pulley $a$ being driven by belt $m$ rotates gear $i$, which drives gear $j$, which drives gears $k\ l$ and shaft $g$ in a direction opposite to that given when the pulley $b$ is directly driven by the belt. The belt $m$ is the means employed to shift the pulleys, the latter being inclined to follow the belt in its movements, so as to cause the bearing-pieces $e\ f$ to rotate upon their carrying-shafts $g\ h$. Hence some means has to be furnished for locking the bearing-pieces during the time that either pulley is being driven by the belt to drive the shaft $g$.

In the drawings the reversing mechanism is shown in connection with the reciprocating block $n$ of an automatic nut-tapping machine, the movements of this block dictating the reversal of the driving. In the present case the bearing-piece $e$ is circular in form and carries at opposite points upon its periphery stops $o\ p$, which are placed one at one side of the face of the bearing-piece and the other at the opposite side.

$r$ is an arm pivoted at $s$; $t$, a connecting-rod, one end of which is secured to arm $r$ at $u$ and the other end of which is furnished with a slot $v$, through which passes a pin $w$, carried by the outer end of a crank $x$, which is carried upon a shaft $y$, the other end of which carries an arm 1, which is furnished with a bifurcated outer end 2, through which a pin 3, carried by the reciprocating block $n$, passes. The block $n$ carries the nuts to be tapped and is drawn in one direction by the tap 4 and in the other direction by the tap 5, operating on the nut or nuts (not shown) carried in block $n$, or is drawn in one direction by one tap and pushed by the other, or vice versa. The taps are carried by shafts 6 7, which carry gears 8 9, which are driven by gears 10 11, carried on shaft $g$.

Supposing the arm $r$ to be engaging the bottom of the stop $p$, this causes the gearing described to drive the taps 4 5 so that the block $n$ is through these taps and the nuts in the block which they are tapping moved from right to left. As soon as the block reaches the end of its stroke the arm 1 is drawn over by pin 3, as shown in Fig. 1, and the pin $w$, carried by crank $x$, engages the left end of slot $v$ in rod $t$ and moves this rod to the left, causing arm $r$ to be moved away from stop $p$ on bearing-piece $e$ and over into the path of the stop $o$. As soon as the bearing-piece is released the belt $m$ carries pulley $b$ around with it, causing a revolution of the several parts of the apparatus carried by the bearing-pieces. The revolution of the bearing-pieces continues until the stop $o$ is engaged by arm $r$. The pulley $b$ is now driven by belt $m$, and through the gears described the driving of shaft $g$ is reversed and with it the driving of the taps 4 5. This reverse movement is continued until block $n$ reaches the end of its stroke to the right, when through the mechanism shown and described arm $r$ is moved to the right and away from stop $o$ and into the path of the stop $p$. The pulley $a$ is now carried upward by belt $m$ and the pulley $b$ downward until stop $p$ engages arm $r$, when the driving of shaft $g$ and connected parts is again reversed.

In the drawings the mechanism is shown driven by a belt $m$, which travels constantly in one direction, the shaft $g$ being reversed when the pulleys $a$ $b$ are shifted so as to change places in engagement with the belt; but if the shaft $g$ were to be driven by any means constantly in one direction—if it were a counter-shaft, for instance, and the pulleys $a$ $b$ were used for driving belt $m$ instead of being driven by this belt—the pulley $a$ would when in contact with the belt drive it in one direction and the pulley $b$ would when in contact with the belt drive it in the other direction.

In the drawings the gearing is such that the shaft $g$ is driven at the same speed in either direction; but by changing the pitch of the gears the mechanism will drive the shaft $g$ in one direction at one speed and in the other direction at a faster or slower speed. Hence the apparatus is designed to serve not only as a reverse movement, but also as a quick return movement.

Having thus described my invention, I claim as new and desire to secure by Letters Patent—

1. In a reversing mechanism, in combination, a driving-belt, two pulleys, means for carrying said pulleys so that they can be rotated in a plane at right angles to their shafts, gears carried by each of said pulleys meshing with each other, a second gear carried by and rotating with one of said pulleys, a gear meshing with said second gear, a shaft upon which said second gear is carried, and means whereby either of said pulleys may be held in operative contact with said driving-belt.

2. In a reversing mechanism, in combination, a shaft, a bearing-piece rotatably carried by said shaft, means for engaging and disengaging said bearing-piece so as to prevent or permit its rotation, two superposed pulleys carried by said bearing-piece, gears connecting said pulleys, and gears connecting one of said pulley-connecting gears and said shaft.

3. In a reversing mechanism, in combination, a shaft, a circular bearing-piece rotatably carried by said shaft and carrying upon opposite sides stops, two studs carried by said bearing-piece at diametrically opposite points, pulleys carried by said studs, gears carried by said pulleys meshing with one another, a gear carried by one of said latter gears meshing with a gear carried by said shaft, said latter gear, a stop adapted to engage alternately the stops on said bearing-piece and means for tripping said stops.

4. In a reversing mechanism, in combination, a shaft, a bearing-piece rotatably carried by said shaft, two superposed pulleys carried by said bearing-piece, and means carried by and turning with said shaft and pulleys, whereby a movement is given to one pulley, upon the rotation of said shaft, in the same direction as said shaft, and to the other pulley in the opposite direction, or vice versa.

5. The combination with a reciprocating block or frame and rotatable means for driving said block or frame in either direction, of a shaft, a bearing-piece rotatably carried by said shaft, two superposed pulleys carried by said bearing-piece, gears connecting said pulleys, gears connecting one of said pulley-connecting gears and said shaft, gears connecting said shaft and said block or frame driving means, means operated by the movements of said block or frame for bringing said pulleys alternately into engagement with a driving-belt, and said driving-belt.

6. The combination in a reversing mechanism of two superposed pulleys, gears carried by and connecting said pulleys, a bearing-piece carrying studs carrying said pulleys, and carrying upon opposite sides stops, said stops, a shaft carrying said bearing-piece, gears connecting said shaft and one of said pulleys, a reciprocating block or frame driven by the movements of said shaft, and means actuated by the movements of said block or frame for engaging and releasing said stops carried by said bearing-piece.

CHAS. W. JAMES.

Witnesses:
 GEORGE W. SELTZER,
 CHARLES A. RUTTER.